United States Patent [19]
Müntener et al.

[11] Patent Number: 5,156,868
[45] Date of Patent: Oct. 20, 1992

[54] METHOD AND APPARATUS FOR OPERATING A CONCHING DEVICE

[75] Inventors: Kurt Müntener, Bad Salzuflen; Bernd Mechias, Braunschweig; Rainer Schmidt, Herford; Claus-Peter Bollhorst, Kalletal, all of Fed. Rep. of Germany

[73] Assignee: Richard Frisse GmbH Maschinenfabrik, Bad Salzuflen, Fed. Rep. of Germany

[21] Appl. No.: 753,825

[22] Filed: Sep. 3, 1991

[30] Foreign Application Priority Data

Sep. 3, 1990 [DE] Fed. Rep. of Germany ....... 4027882

[51] Int. Cl.$^5$ .......................... A23G 1/00; B23Q 15/00
[52] U.S. Cl. ........................................ 426/231; 99/348; 99/485; 99/486; 366/601; 426/519; 426/660
[58] Field of Search ....... 426/231, 660, 519; 99/485, 486, 348, 483; 366/601

[56] References Cited
U.S. PATENT DOCUMENTS 3,976,806  8/1976  Ziccarelli ............................. 426/660
4,713,256  12/1987  Chaveron et al. .................. 426/660

*Primary Examiner*—George Yeung
*Attorney, Agent, or Firm*—Martin A. Farber

[57] ABSTRACT

Method and apparatus for operating a conching device with a trough (1) in which at least one rotor, driven by at least one electric motor (9), is arranged. This rotor is fitted with refining tools spaced apart in axial distances to one another around its periphery. The driving motor is controlled by means of a motor control unit in dependency upon a difference signal of a performance-regulating circuit (22), gained by comparison (6) between a desired nominal value (7) and an actual value (5) of at least one motor performance parameter (22).

To perform the conching process in the minimum possible time, it is provided that the difference signal of the performance-regulating circuit (5–8) remains ignored during at least a time interval. Thus, the driving motor (9) can take a maximum motor current, and it runs up to the speed required within a very short time.

32 Claims, 4 Drawing Sheets

METHOD AND APPARATUS FOR OPERATING A CONCHING DEVICE

FIELD OF THE INVENTION

The invention relates to a method for operating a conching device for treating chocolate masses by kneading and mixing them within a trough, in which at least one rotor rotates, driven by an electric drive, which rotor carries refining tools distributed around its periphery and spaced apart in axial distances to one another, with the respective drive being controlled by a motor control unit in dependency upon a difference signal of a performance-regulating circuit, attained by a comparison between a desired nominal value and an actual value of at least one motor performance parameter, and with predetermined speeds and/or directions of rotation being adjusted during operation of the conching device for predetermined periods of time; as well as an apparatus for carrying out such a method.

BACKGROUND OF THE INVENTION

In the case of a conching device known from DE-OS 39 34 047, the speed of the motor is adjusted in dependency upon a given motor current. By using this design, the maximum possible drive power during a conching process is to be maintained in accordance with the various states of aggregation of the chocolate mass. In FIG. 1 of the present application, the performance versus time during a conching process is illustrated graphically. In this connection, the illustrated plane beneath the curve represents the energy consumed, or work done for the conching process.

When using a conching device that can be operated both as a dry conching device and a liquid conching device by changing the speed and the direction of rotation of the rotors, a curve $P_1$ will normally result, representing the current consumption and thus a parameter of the motor performance as a function of time. In this arrangement, the chocolate mass first assumes a dry-pasty condition during a time interval d1, whereupon it changes into a viscous-plastic condition during a desired time interval d2. About from an instant of time t3on, the chocolate mass changes into a liquid condition by the addition of fat and emulsifying agents, during which phase only a minimum of energy will be introduced. The liquid phase lasts for a time interval d3.

To shorten the conching time, it is also known to do the necessary conching work by increasing the transduction during the dry-pasty and viscous-plastic phase of the mass. The power curve P2 associated therewith is represented in FIG. 1 of the present application by P2. During a first time interval d4, the conching device operates at high speed, thereafter at a lower speed for a time interval d5. When the current intake of the driving motor is decreased due to the continuous softening of the chocolate mass, a higher speed will be employed during a time interval d6, and finally the conching process will be finished at a still high speed during a time interval d7, with the direction of rotation being reversed. Also when using a procedure as described in connection with the current curve P2, a dry-pasty phase results during a time interval d1, being followed by a viscous-plastic phase during a desired time interval $d2_2$, and finally, after the admixture of fat and emulsifying agents at an instant of time t4, the chocolate mass will pass through a liquid condition during a time interval $d3_2$. With this mode of operation, the time saving represented by s in FIG. 1 is accomplished due to the fact that the work performed in the case of current curve P1 from an instant of time t0 to t1 is equivalent to the work performed represented by a current curve P2 from an instant of time t0 to t2.

From the curve shape it becomes apparent that an area beneath an admissible maximum value M remains, as represented in diagonal hatching, which could be utilized to further intensify the conching work.

It is an object of the present invention to provide a method for operating a conching device, with which the time interval required for a conching process can be reduced by increasing the working capacity of the conching device. In addition, an apparatus for carrying out the method is to be provided.

SUMMARY OF THE INVENTION

This object is attained according to the invention by ignoring the difference signal of the performance-regulating circuit during at least a time interval.

By the use of such an arrangement, different modes of operation become possible without impairing the control behavior, that is to say, both an operation, or a start-up of a conching device already filled, respectively, and a no-load operation or the start-up, respectively, with the conching device being filled but gradually, as will be seen from the explanations below.

When the conching device is operated in a filled state, an increased current intake of the motor will be made possible due to the fact that the difference signal derived from the difference between the nominal and actual motor performance (or at least of a parameter thereof) remains ignored during a given time interval (it need not be predetermined in its length, but can be made dependent upon the occurrence of an incident), with the result that the motor operating with a higher current runs up to at least its nominal speed in a shorter time. Consequently, the starting phase of the conching process will be shortened, whereby a time saving for the whole conching process is accomplished.

It is advantageous to ignore the difference signal at the beginning of the first time interval, that is, when starting the conching device, and particularly to override it, since with this arrangement the relatively long starting phase of the motor from a standstill to the speed required can be reduced considerably. A particular advantageous arrangement is provided by ignoring the difference signal during several time intervals, or by overriding it, respectively.

The use of an arrangement in which the speed control circuit overrides the performance-regulating circuit when the actual rotational speed is close to the nominal speed, represents a particular improvement of the invention. This is advantageously accomplished by always having the speed-regulating circuit override the current-regulating circuit when the actual speed of the driving motor deviates from the nominal speed foreseen for that particular time interval. For if the conching device is then started up in a filled state, the effect already described above will result. If however, the conching device is started up with no load, the current regulation will be activated practically immediately due to an insufficient current intake, which will enable a maximum speed right from the start. Only with the gradual filling will the speed slow down to such an extent that it falls below a predetermined value, whereupon the above-mentioned predetermined time interval is initiated. This design thus enables an unusual flexibility of the operating mode, particularly because the motor (or the motors in the case of a plurality of driving motors) is each time allowed to run up to its maximum performance during the given time interval.

If an arrangement is chosen in which the speed control circuit overrides the difference signal whenever the actual speed is greater than the nominal speed by a percentage within a range of 1% to 10%, but suitably about 5%±1%, it will be ensured that the motor cannot fall below its nominal speed because the control system relating to the above arrangement will intervene early enough. This is accomplished in a particular advantageous way by using an arrangement in which, during at least a part of the operation of the conching device, the difference signal of the performance-regulating circuit remains ignored, or is overridden, respectively, when the predetermined nominal value of the motor performance parameter does not suffice to maintain a predetermined nominal speed. On the other hand, the return to the control dependent upon the performance will be best accomplished by using either an arrangement in which the step of overriding by the speed control circuit will be terminated only when, on the one hand, the actual speed is close to the nominal speed, and, on the other hand, the actual performance value of the drive is close to the nominal performance value; or in which the step of overriding by the speed control circuit is terminated when the actual performance value of the drive is below the nominal performance value by a predetermined, relatively low, value, for example a value between 1% to 10%, but conveniently between approximately 5%±1%; or else in which the given time interval is terminated when the nominal value of the motor performance parameter enables the actual speed to be close to the predetermined nominal speed.

BRIEF DESCRIPTION OF THE DRAWINGS

Other characteristics of the invention will result from the following description and the embodiments schematically shown in the drawings, in which.

DETAILED DESCRIPTION OF THE DRAWINGS

Figure 1:
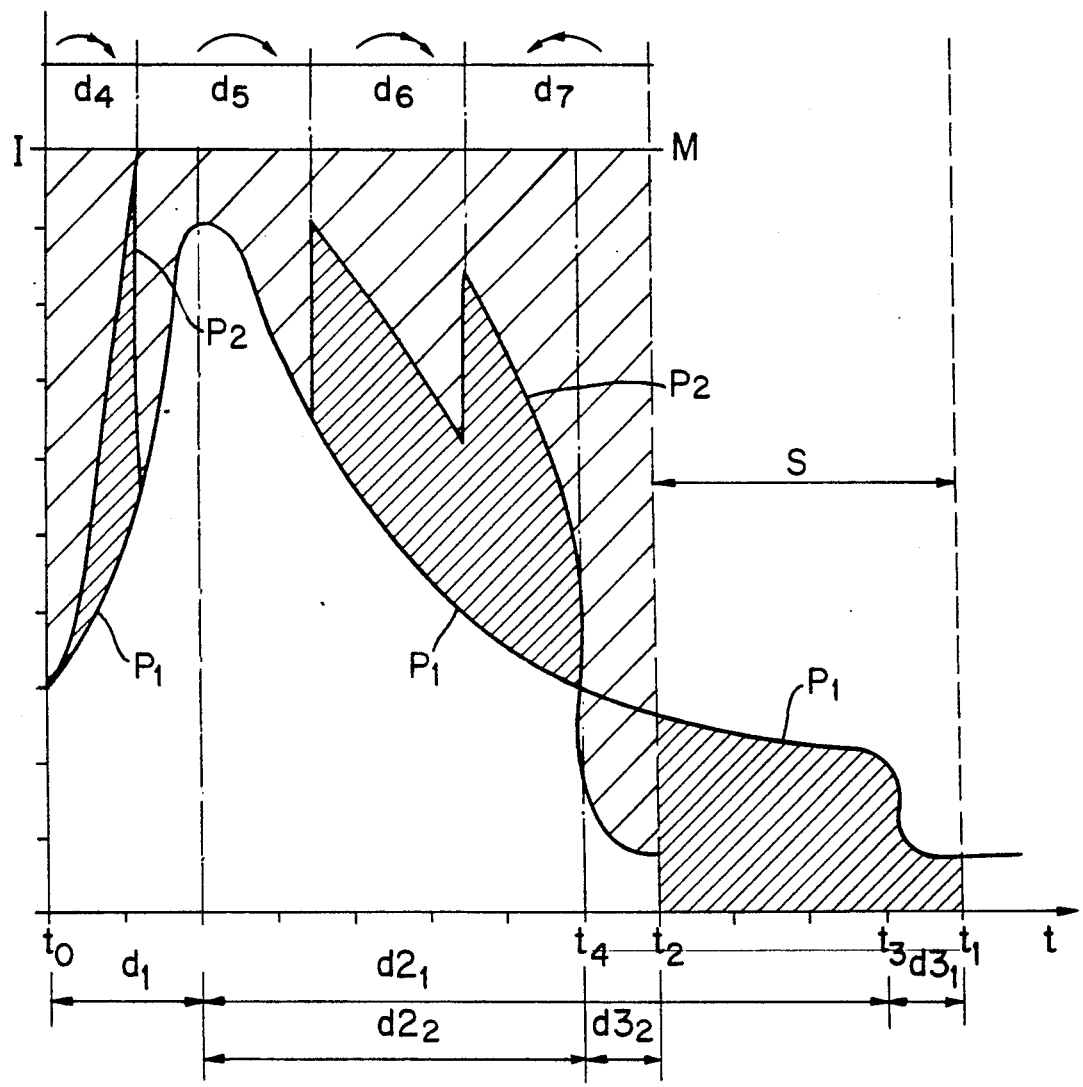
FIG. 1 shows a graph of the performance curve of a conching process versus time.

Within a conching device 1 (FIG. 1A), rotors in the interior of the trough of the conching device 1, rotating in respective trough compartments, are driven by means of two rotor shafts 2 and 3. It is true that the embodiment shows a two-shaft conching device, but the conching device may comprise an optional number of shafts, for example only one shaft or three shafts, etc.

The drive of the rotor shafts 2 and 3 is accomplished via a common driving motor 9, for instance a squirrel-cage motor, but preferably a polyphase motor, which, in the embodiment represented, drives shaft 3, and shaft 2 via intermediate gear wheels 4. A separate driving motor for each shaft may also be convenient. The basic construction of a conching device is explained in more detail in DE-OS 39 24 047 the entire disclosure of which is incorporated herein by reference.

The driving motor 9 is connected to a polyphase power supply illustrated via main switch S represented schematically only. Upon closing main switch S, a time element t is triggered simultaneously, whose output signal is evaluated for starting the driving motor 9.

The current intake of driving motor 9 is detected via a current-metering unit 5 of a design known per se preferably bridge-connected to the motor whose output signal corresponds to the actual value of the motor current and is fed to a comparator 6. This receives its comparative value from a set-point adjuster 7 indicating the adjustable nominal value of the motor current. The output signal of comparator 6 is supplied to a motor control unit 8, regulating—for example by means of a phase-cutting or—splitting control—the current intake of the motor. The nominal value of set-point adjuster 7 is preferably selected beneath a maximum admissible motor current, so that overloads of the motor will absolutely be excluded. It is to be understood, however, that instead of the measuring of the motor current the motor voltage or both performance parameters may be used for the control, if so desired.

When starting driving motor 9 after the beginning of operation of the conching device (closure of main switch S), with the conching device being in a filled state, a very high motor current may be admitted, since the chocolate mass will still be in a dry-pasty condition. The planned limiting of the motor current would otherwise counteract the allowance of this high current. In accordance with the invention, a time element t may therefore be provided, whose output signal controls set-point adjuster 7. Thus, after closing main switch S for a time interval preset by time element t, with the output signal ingoing, the set-point adjuster 7 is adjusted, or overridden, respectively, in such a manner that driving motor 9 can take a higher—for example the maximum admissible—motor current, at least during the starting phase of the conching process. This can take place in such a manner that, with the output signal of time element t being present, the nominal value of set-point adjuster 7 is increased for the starting phase to such an extent that it corresponds approximately to the otherwise maximum admissible motor current (slight deviations from the maximum current are possible). It may also be convenient to raise the nominal value of set-point adjuster 7 not only above the preset nominal value but also distinctly above the maximum admissible motor current, so that the current-regulating circuit 22 will practically be out of operation. This may suitably be achieved also by an interrupter controlled by timing member t interconnected between comparator 6 and motor control unit 8.

It may be advantageous to always start time element t when the speed or the direction of rotation of the driving motor is changed, for example at the transition point of time interval d4 to time interval d5, or of time interval d6 to time interval d7, respectively. The time interval of the time element is chosen so that the driving motor can run up to nominal speed without any difficulties during the starting phase. In general, this time interval is relatively short; it may be within the range of two minutes, by way of example.

To ensure running up of the driving motor to at least its nominal speed, it may be advantageous to provide a speed-regulating circuit 12 besides the current-regulating circuit 12, in particular in order to control the motor via its speed at least at the start, while actual performance and desired nominal value parameters are being compared simultaneously.

After the start 10 of the driving motor, the actual speed $n_I$ (actual value) detected via a speedometer is compared to the nominal speed $n_S$ of the motor (nominal value) via a decision lozenge. If the actual value $n_I$ is smaller than or equivalent to the nominal speed $n_S$, it will be switched to the speed-regulating circuit 12 to achieve a corresponding change of the speed, for example by means of frequency regulation. The comparison between actual speed and nominal speed is continuously repeated until the actual speed reaches the nominal speed, entailing the switching over to the current-regulating circuit 22. via the decision lozenge. Also during operation of the current-regulating circuit 22 the comparison between nominal speed and actual speed will be made again and again, and, in the case of a speed drop, a change-over back to the speed-regulating circuit 12 via decision lozenge 11 will occur.

Figure 2:
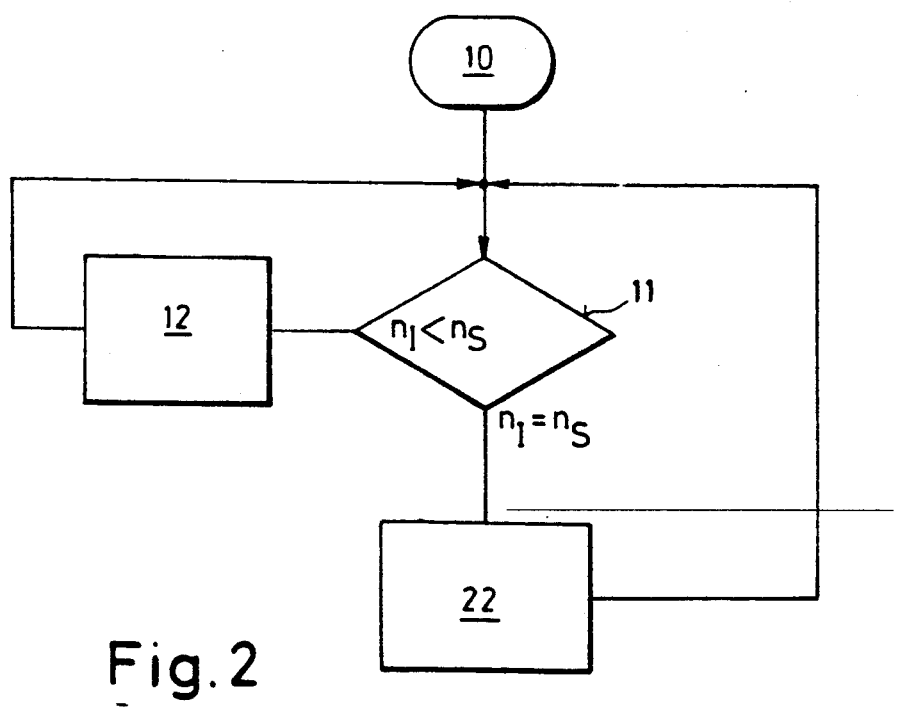
FIG. 2 shows a representation showing on principle the change-over switching for the operation of a conching motor with the help of a current-regulating circuit and a speed-regulating circuit.

With such a change-over switching, the speed, being important for the conching work, will be monitored in addition to the continuously monitored performance, so that, on the one hand, a minimum speed (=nominal speed) will be maintained, but on the other hand, an optimum performance control will be ensured, with the help of which the maximum performance, important for the conching work, will be maintained continuously. An advantageous embodiment of such a change-over switching according to FIG. 2 is represented schematically in FIG. 3 as a block diagram, with the components of identical function having the same reference symbols as above, with the components of a similar function, however, having the same reference symbols but with a hundred added.

Figure 1A:
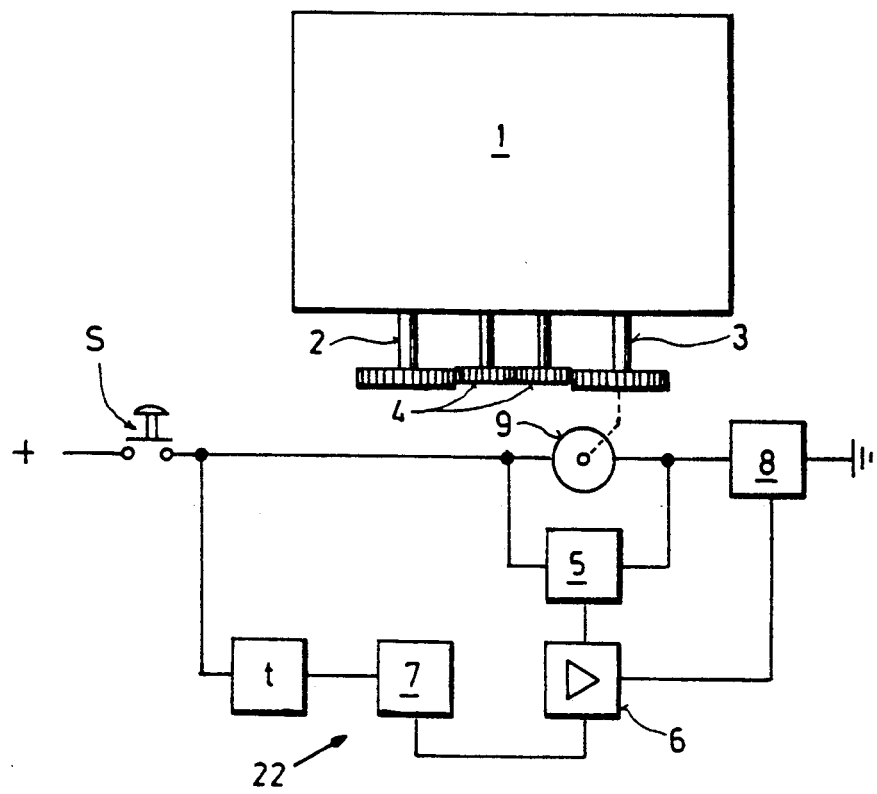
FIG. 1A illustrates a simplified control circuit for the driving motor of a conching device in a schematical representation.

The current-regulating circuit 22 shown in FIG. 3 again consists of the subassemblies 5 to 8 according to FIG. 1A. Comparator 6 compares the desired nominal value of the motor current preset by set-point adjuster 7 to the actual performance value of the motor current detected by the current-metering unit 5. The output of comparator 6 is connected to motor control unit 8 via a gate circuit 118. Moreover, the output of comparator 6 is fed to the second input of gate circuit 118 and to a control stage 16 via a threshold switch 119.

Figure 3:
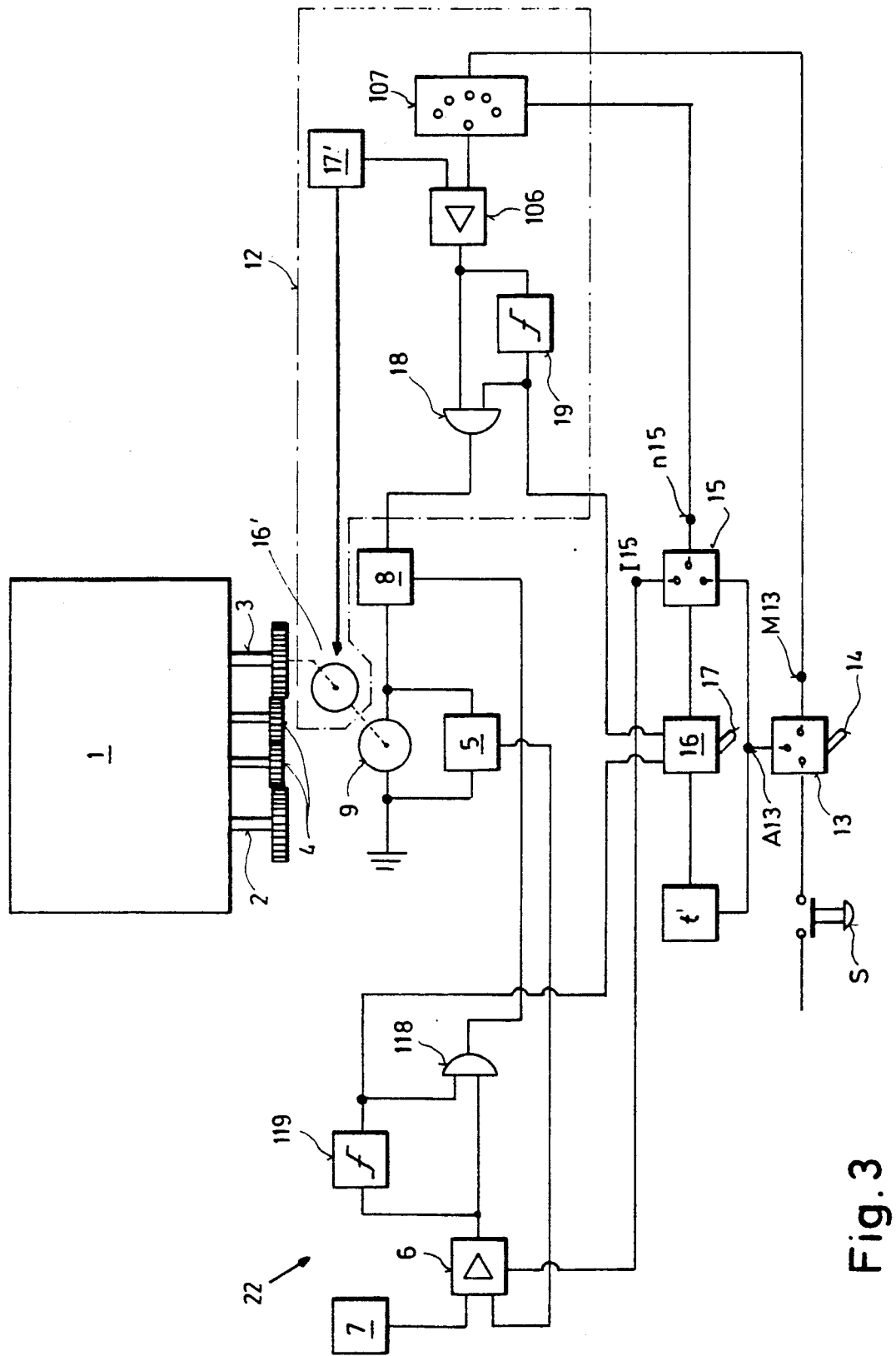
FIG. 3 represents a schematic block diagram for an embodiment of a change-over switching according to FIG. 2.

The speed-regulating circuit 12 apparent from FIG. 3 is composed of a comparator 106 comparing the desired nominal value of a speed set-point adjuster 107 with an actual value of the speed. The actual value of the speed is read from the motor shaft of driving motor 9 via a frequency generator 16', by way of example, and supplied to the comparator input of comparator 106 via a measuring transducer 17'. The output of the comparator is connected to motor control unit 8 via a gate circuit 18 (logical AND-gate). Further, the output of comparator 106 is located at the input of a threshold switch 19, whose output is connected to the second input of gate circuit 18 and control stage 16.

After closing main switch S, the operating mode of the change-over switching is set via a selector switch 13. Via a tilting switch 14, selector switch 13 can be switched over between an output A13 for automatic performance control and an output M13 for manual speed control.

When output M13 is switched on, the speed-regulating circuit 12 is in operation. A particular speed from a number of different speeds is chosen by means of an optional actuating appliance at the set-point ajduster 107 for the speed value, so that motor control unit 8 adjusts the corresponding speed in dependency upon the output signal of comparator 106.

If selector switch 13 is connected to output A13, a switching stage 15 will be activated, which switching stage can be switched over by a control stage 16. Control stage 16 may be actuated, on the one hand, manually via a handle 17, or by means of electric output signals of a time element t' (FIG. 3) corresponding to time element t (FIG. 1A) of the current-regulating circuit 22 or the speed-regulating circuit 12. If the switching stage 15 is switched to the exit I15 via control stage 16, the current-regulating circuit will be operative. If, however, switching stage 15 is switched to the exit node n15, the speed-regulating circuit 12 will be activated. In this connection, the exit node n15 acts on the set-point adjuster 107 of the speed-regulating circuit 12, whereby the nominal value for the speed, required in the case of automatic performance control, is put into circuit when the speed-regulating circuit is set going.

The threshold value of threshold switch 19 of the speed-regulating circuit 12 is adjusted so that it will switch only when the difference between the nominal speed and the actual speed falls below a deviation of 5%, for example corresponding to a threshold value, that is, when the motor runs at a distinctly lower speed than desired. The actual speed is represented by an electric signal produced by a speed sensor 16' connected to the shaft of the motor 9, and transmitted to the comparator 106 via amplifier 17'. Thereafter, the gate circuit 18 is opened by the output signal emitted by threshold switch 19, and the output signal of comparator 106 is connected through to motor control stage 8 for controlling purposes. The positive output signal of threshold switch 19 further acts on control stage 16 in such a manner that control stage 16 maintains switching stage 15 switched to the exit n15.

When driving motor 9 reaches the preset nominal speed, the difference signal at the exit of comparator 106 will decrease.

Should the output signal fall below the threshold value of threshold switch 19, the output signal of which will disappear, and the gate circuit will be inhibited accordingly. Due to the missing signal from threshold switch 19, the control stage will switch the switching stage 15 over to exit I15, so that the current-regulating circuit 22 will be activated and the speed-regulating circuit will be switched off. In the same way, the threshold switch 119 of the current-regulating circuit 22 activates gate circuit 118 and control stage 16, as described above with respect to the speed-regulating circuit 12. When the actual performance value of the motor current approaches the adjusted nominal value, the output signal of threshold switch 119 will be deleted, whereupon gate circuit 118 will close, and control stage 16 will switch switching stage 15 back to exit n15.

To ensure that driving motor 9 quickly runs up to its desired speed—in particular during the starting phase of the driving motor at the beginning of a conching process, or else at the transition point of a time interval d4 to a following time interval d5, and the like—the time element t' will be provided. Thus, when switching on main switch S, and with the output A13 of selector switch 13 activated, time element t' will be started, which will hold switching stage 15 on exit n15, via control stage 16 for the adjusted time interval. Thus, at least during the starting phase, a mere frequency control of driving motor 9 will take place in a time-dependent manner, so that the driving motor—independently of its current intake—will quickly run up to its desired speed.

Figure 4:
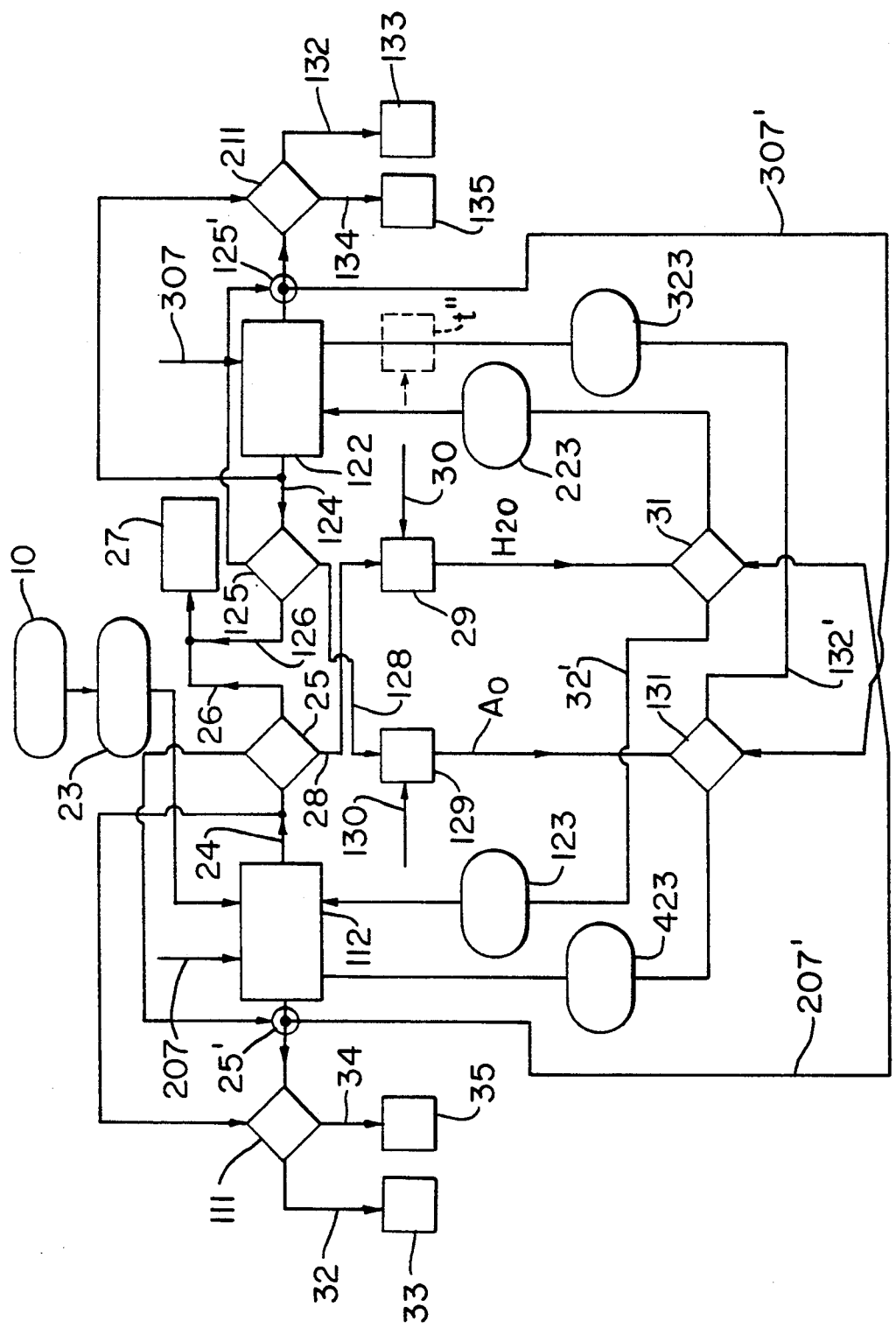
FIG. 4 shows a software program for carrying out the method as provided by the invention according to a preferred embodiment with the help of a computer control unit.

In the case of a software design of program control units, as is common use today, one may proceed according to FIG. 4, which shows a more detailed modification of the principle represented in FIG. 2. In this case, subsequent to the start 10, a switching occurs to a speed control 112 via a fixed linkage, which speed control 112 receives a preset nominal speed via an input 207. If the actual speed detected does not correspond to this nominal value, a linkage 24 to a decision lozenge will result, in order to ascertain whether the speed control is already operative or not. If so, the respective actual performance value will be supplied to an actual value display 27 via a linkage 26.

If, however, the speed control has not been operative up to this moment, it will be convenient to feed the actual value detected to a speed processor 29 via a connecting line 28, in which speed processor 29 the actual value will be reduced by a particular percentage. This percentage is relatively low, in fact, it will generally amount to 1% to 10%, therefore preferably around 5% approximately; in particular cases, however, a value being higher or lower by 1% may be chosen. In special cases, even a value of 0% may be sufficient. For this purpose, an input linkage 30 will be provided. It is to be understood that alternately also the nominal value input 207 may be supplied to the processor 29. In place of a percentage calculator with ensuing subtraction (or a corresponding multiplication, respectively), a simple subtraction circuit may be employed, reducing the actual value by a predetermined value.

Preferably only after this subtraction in processor 29, a decision lozenge 31 is selected via a linkage Hzo, to which linkage the nominal signal of input 207 is fed via the speed-regulating circuit 112 and a linkage 207', and which now compares this nominal speed value to a value reduced by a particular percentage (thus corresponding to a comparator stage), and ascertains whether the nominal value is greater than the value of the linkage Hzo, or not. Should the nominal speed value be greater, that is to say, the actual value reduced by some percent does not reach it yet, the signal passes to a fixed linkage 123 via a linkage path 32', which linkage 123 keeps the speed control 112 in operation.

The speed control then functions via a decision lozenge 111, to which is fed, on the one hand, the actual speed value from the linkage 24, and, on the other hand, the nominal speed value from input 207 via speed control 112, in order to enable the decision whether the nominal speed is still lying above the actual speed. If so, a command 33 for the speed increase will be given via a linkage 32, for example by opening a current valve. In the reverse case, a command 35 for the speed reduction (for example "close current valve") will be given via a linkage 34. The decision lozenge 111 is connected to speed control 112 via a switching function 25', so that, in dependency upon the decision of the lozenge 25, the nominal value from speed control 112 will not be supplied to decision lozenge 111 when the speed control is not supposed to be in operation at all.

If, however, the actual speed reduced by just a few percent already reaches the nominal value at the decision lozenge 31, that is to say, the actual value comes already close to the nominal value, then a switching-over to a current control 122 via a fixed linkage 223 will occur. For in order to reduce the time constant of the control, the intermediate stages 28-30 will be advantageous, so that—now that the nominal speed has almost been reached—the attention may be directed to the keeping of the motor performance.

Similar to the speed control 112, also the performance control (in general a current control) receives a preset nominal value via an input 307. Should the performance parameter detected not correspond to this nominal value, a linkage 124 to a decision lozenge 125 will result, in order to ascertain whether the performance control is already in operation or not. If so, the respective actual value will be fed to an actual value display 27 via a linkage 126. According to the design, the display 27 has either separated fields for displaying speed and current, or else only a single field, in which a symbol is displayed, in addition to the value, which symbol shows whether this value refers to the speed or the current. This latter design also has the advantage that it will thereby become apparent which one of the two controls 112 or 122 is being in operation.

If, however, the performance control has not been operative up to this moment, it will be convenient to feed the actual value detected to a current-value processor 129 via a connection line 128, in which processor 129 the actual value will be increased by a certain percentage. Also this percentage is relatively low, amounting to a value within the range indicated above for processor 29. For the input of this percentage value an entry 130 will be provided. Also in this respect it is to be understood that alternately the nominal value (input 307) may be supplied to processor 129. In place of a percentage calculator with ensuing addition (or a corresponding multiplication, respectively), a simple adder may also be employed, which increases the actual value by a predetermined value.

Preferably only after this addition in processor 129, a decision lozenge 131 is selected via a linkage Ao, to which the nominal signal of input 307 is supplied via the performance control 122 and a linkage 307', and which now compares this nominal value of the performance parameter to a value increased by a predetermined percentage (thus corresponding to a comparator stage), and ascertains whether the nominal value is greater than the value of the linkage Ao, or not. If the nominal value (admitted maximum value) is greater than the actual value reduced by some percent, then a switching-back to the performance control 122 will be performed via a fixed linkage 323 located on a line 132' in order to get an actual value being as close as possible to the admitted maximum value. When using this design, a time member t" precedes or succeeds the fixed linkage in order to retard the transition from the speed control to the performance control, all the more so as this linkage branch will only be used if the performance control has not been operative up to this moment (cf. the foregoing explanations with respect to the decision lozenge 125). This time element corresponds substantially to the time members t, or t', respectively (in particular to the former), and it could be put into operation by the starting switch 10 only for a limited time interval upon starting the operation of the conching device, since thus—particularly if the conching device is started with no load—any possible control fluctuations will be prevented and a building-up time for the speed will be ensured. The arrow drawn in broken lines to the time member t" represents the input of the desired time lag. Thus, the signal for terminating the time interval given by the speed control will be influenced in the sense of a retardation unless the time lag will be adjusted to zero.

Analogous to the speed control, the performance control operates via a decision lozenge 211, to which is supplied, on the one hand, the actual performance value from linkage 124, and, on the other hand, the nominal performance value from input 307 via performance control 122, for the decision whether the nominal performance, or the nominal current, respectively, is still lying above the actual value. If so, a command 133 is given for increasing the speed (for an increase of the current intake) via a linkage 133; in the contrary case, a command 135 is given for reducing the speed via a linkage 134, so that the current intake, or performance, respectively, will be reduced. When using this design, the synergetic effect of such a control combination is made particularly clear. Analogous to switching function 25', a switching function 125' is provided here, which does not feed the nominal value to the decision lozenge 211 when a performance control is not supposed to be operative at all.

Should the nominal current at the decision lozenge 131 not be greater any longer than the actual performance value (Ao) increased by some percent, then the signal travels to a fixed linkage 423, which switches back to speed control 112 because now the maximum performance appears to be ensured. In this respect, calculating stage 129 has the advantage that a certain (small) gap to the maximum admissible performance value generally chosen as high as possible exists, so that the motor cannot be overloaded unexpectedly during the time interval of the frequency control. If also the speed corresponds to the nominal value, an immediate change-over to the performance control will take place in any case.

It is to be understood that within the scope of the invention numerous modifications will be possible; for example it would be conceivable to make the decisions, made via the decision lozenges 111 and 31, or 211 and 131 in common, since they are generally very similar to one another, and to perform the arithmetical operations thereafter with the help of 29 and 129. Besides, it will also be understood that the representation of FIG. 4 can easily be converted into a corresponding circuit diagram, in which the individual linkages will designate the lines to the individual switching circuits.

What is claimed is:

1. A method for operating a conching machine for treating chocolate masses by kneading and mixing them within a containment which houses at least one rotor with mixing means, said rotor being driven by an electric motor having a maximum performance parameter, the method comprising the steps of
   imparting a rotational movement to said rotor to assume an actual rotational speed during at least one predetermined period of treatment;
   controlling said movement by varying at least one parameter of said rotational movement selected from the group consisting of speed and direction of said rotor;
   said step of controlling including:
   monitoring at least one actual performance parameter of said motor;
   comparing said actual performance parameter with a preset desired nominal value; and
   deducing a difference signal derived from the difference between said actual performance parameter and said nominal value, said difference signal remaining ignored for said controlling step during at least one given time interval.

2. Method as claimed in claim 1, wherein said time interval is an initial time interval at the beginning of operation of said conching machine.

3. Method as claimed in claim 2, wherein said initial time interval is preset.

4. Method as claimed in claim 1, wherein said step of ignoring takes place during several time intervals during said period of treatment.

5. Method as claimed in claim 1, wherein said step of ignoring comprises overriding said difference signal by a motor control signal.

6. Method as claimed in claim 5, wherein said step of overriding comprises altering said nominal value.

7. Method as claimed in claim 6, wherein
   said nominal value is altered to a value greater than said maximum performance parameter.

8. Method as claimed in claim 5, wherein said motor control signal is derived from a revolution control circuit for maintaining a predetermined nominal rotational speed of said motor.

9. Method as claimed in claim 8, wherein said revolution control circuit is overriding said difference signal whenever said actual rotational speed is close to said nominal rotational speed.

10. Method as claimed in claim 6, wherein said revolution control circuit is overriding said difference signal whenever said actual rotational speed is greater than said nominal rotational speed by a percentage within the range of 1% to 10%.

11. Method as claimed in claim 10, wherein said percentage amounts to 5%±1%.

12. Method as claimed in claim 8, wherein said step of overriding said difference signal is executed during at least one time interval when said nominal value is too small to allow said predetermined nominal rotational speed.

13. Method as claimed in claim 6, wherein
   said step of overriding said difference signal will only be stopped when said actual rotational speed is close to a predetermined nominal rotational speed and said actual performance parameter is close to said nominal value.

14. Method as claimed in claim 13, wherein said stopping will occur if said actual performance parameter is below said nominal value by an amount being within the range of 1% to 10%.

15. Method as claimed in claim 13, wherein said stopping will occur if said actual performance parameter is below said nominal value by an amount of 5%±1%.

16. Method as claimed in claim 6, wherein
   said given time interval is terminated when said nominal value enables the actual rotational speed to be close to a predetermined nominal rotational speed.

17. A conching machine for treating chocolate paste by kneading and mixing comprising
   a containment;
   at least one rotor within said containment;
   at least one motor for driving said rotor;
   a control circuit for controlling said motor;

detecting means for detecting an actual value of at least one performance parameter of the motor;

means defining a nominal value of said performance parameter of the motor;

comparator means for supplying a first control signal and having a first and a second input as well as an output, said first input being connected to said detecting means for receiving said actual value, whereas said second input is connected to said nominal value defining means, said output being connected to said control circuit for controlling said motor;

a circuit for disconnecting said comparator means from said control circuit for a given time; and signaling means for supplying a termination signal for terminating said given time, said signaling means being connected to said disconnecting circuit.

18. Conching machine as claimed in claim 17, further comprising a time element for determining said given time at least in part.

19. Conching machine as claimed in claim 18, wherein said time element is interconnected between said signaling means and said disconnecting circuit for providing a predetermined time delay for said terminating signal.

20. Conching machine as claimed in claim 17, further comprising a revolution control circuit, including detector means for determining the value of an actual rotational speed and for producing a corresponding output signal, means supplying an output signal corresponding to a predetermined nominal rotational speed, and comparator means having first and second inputs for receiving and comparing said output signals and an output for supplying a corresponding second control signal;

said disconnecting circuit comprising switching means for connecting said control circuit for controlling said motor to said revolution control circuit during said given time.

21. Conching machine as claimed in claim 20, wherein said switching means further comprise a loop for monitoring the actual rotational speed and for comparing said actual rotational speed with said predetermined nominal rotational speed.

22. Conching machine as claimed in claim 21, wherein said loop comprises a calculating element for altering the relative difference between said actual rotational speed and said predetermined nominal rotational speed before supplying a corresponding calculated signal to said comparator means.

23. Conching machine as claimed in claim 21, wherein said loop comprises a calculating element operative to lower a value of the actual rotational speed.

24. Conching machine as claimed in claim 21, wherein said loop comprises a calculating element operative to increase the value of said predetermined nominal rotational speed.

25. Conching machine as claimed in claim 20, wherein said switching means comprise means for determining a threshold value being connected to the output of said comparator means and having an output.

26. Conching machine as claimed in claim 25, wherein said switching means comprise an AND-gate having a first and a second input, the first input being connected to the output of said threshold value determining means, the second input being connected to the output of said comparator means for supplying said second control signal to said control circuit for controlling said motor as a function of a level of said second control signal.

27. Conching machine as claimed in claim 17, wherein said disconnecting circuit further comprises a loop for monitoring said actual value and for comparing it with said nominal value.

28. Conching machine as claimed in claim 27, wherein said loop comprises a calculating element for altering the relative difference between said actual value and said nominal value of said performance parameter of the motor before supplying a corresponding calculated signal to said comparator means.

29. Conching machine as claimed in claim 27, wherein said loop comprises a calculating element for altering the relative difference between said actual value and said nominal value of said performance parameter of the motor before supplying a corresponding calculated signal to said comparator means; and wherein said calculating element is operative to increase said actual value of said performance parameter.

30. Conching machine as claimed in claim 27, wherein said loop comprises a calculating element for altering the relative difference between said actual value and said nominal value of said performance parameter of the motor before supplying a corresponding calculated signal to said comparator means; and wherein said calculating element is operative to lower the nominal value of said performance parameter.

31. Conching machine as claimed in claim 17, wherein said disconnecting circuit comprises means for determining a threshold value being connected to the output of said comparator means and having an output.

32. Conching machine as claimed in claim 17, wherein said disconnecting circuit comprises an AND-gate having a first and a second input, the first input being connected to the output of said threshold value determining means, the second input being connected to the output of said comparator means for supplying said first control signal to said control circuit for controlling said motor as a function of a level of said first control signal.

* * * * *